United States Patent [19]

Higuchi

[11] Patent Number: 5,393,144
[45] Date of Patent: Feb. 28, 1995

[54] LINEAR MOTION GUIDE UNIT

[75] Inventor: Tatsuo Higuchi, Fukuoka, Japan

[73] Assignee: Nippon Thompson Co., Ltd., Tokyo, Japan

[21] Appl. No.: 134,587

[22] Filed: Oct. 12, 1993

[30] Foreign Application Priority Data

Oct. 14, 1992 [JP] Japan .............................. 4-077806[U]

[51] Int. Cl.⁶ .............................................. F16C 29/06
[52] U.S. Cl. ......................................... 384/45; 384/49
[58] Field of Search ..................................... 384/43–45, 384/47–49, 59, 33, 9

[56] References Cited

U.S. PATENT DOCUMENTS

| | | | |
|---|---|---|---|
| 4,764,032 | 8/1988 | Tanaka | 384/45 X |
| 4,796,516 | 1/1989 | Horváth | 384/49 X |
| 4,867,578 | 9/1989 | Komiya | 384/49 X |
| 4,983,048 | 1/1991 | Jacob | 384/43 |
| 5,149,204 | 9/1992 | Tennuchi | 384/45 X |
| 5,230,567 | 7/1993 | Takeuchi | 384/43 |

*Primary Examiner*—Thomas R. Hannon
*Attorney, Agent, or Firm*—Sughrue, Mion, Zinn, Macpeak & Seas

[57] ABSTRACT

A linear motion guide unit is described that contributes to reduced weight and reduced manufacturing costs of the moving portion such as a table that is supported and guided.

The present invention offers these advantages by providing a mounting surface for mounting a table to the ends in the direction of movement of a slider, and forming a mounting portion for attaching a fastening member to said mounting surface.

1 Claim, 6 Drawing Sheets

LINEAR MOTION GUIDE UNIT

BACKGROUND OF THE INVENTION

1. Field of the Invention

The present invention relates to a linear motion guide unit that guides an object to be moved, and which is equipped on, for example, a machine tool or industrial robot.

2. Description of the Prior Art

An example of this type of linear motion guide unit of the prior art is the linear motion rolling guide unit shown in FIGS. 1 and 2.

As shown in the drawings, the linear motion rolling guide unit has track rail 1, in which tracks in the form of a pair of track grooves 1a are formed in both the right and left sides along the lengthwise direction, a slider in the form of sliding unit 3 having rolling element circulating path 2 (refer to FIG. 2, to be later described in detail) and able to move relative to said track rail 1, and a plurality of rolling elements in the form of balls 4, that bear the load between track rail 1 and sliding unit 3 by circulating while rolling over the above-mentioned track grooves 1a accompanying movement of sliding unit 3, and which are arranged and contained within said rolling element circulating paths 2.

Sliding unit 3 has casing 6, provided so as to straddle about track rail 1, and seals 8a and 8b provided on the front and back ends of said casing 6. A flat mounting surface 6a for attaching a table to be described later is provided on the top of casing 6, and a plurality of threaded holes 6b are formed in said mounting surface 6a into which bolts 9 for fastening the table are screwed.

In addition, the above-mentioned rolling element circulating path 2 is formed in both the left and right sides of casing 6, and is composed of load bearing track grooves 2a and return path 2b formed linearly and in parallel with each other as shown in FIG. 2, and direction changing path 2c that connects the ends of loading bearing track grooves 2a and return path 2b. The above-mentioned load bearing track groove 2a corresponds to track groove 1a of track rail 1.

Furthermore, grease nipple 10 for supplying grease to the above-mentioned balls 4 is mounted on the side of casing 6.

FIG. 3 shows an example of using a linear motion rolling guide unit having the above-mentioned constitution with track rail 1 positioned vertically.

As shown in the drawing, a pair of vertical supports 13 are provided, and one set each of linear motion rolling guide units are mounted in a state of mutual correspondence. More specifically, as shown in FIG. 1, a plurality of bolt insertion holes 1b are formed at equal pitch in track rail 1. Bolts 14 inserted into bolt insertion holes 1b are then screwed into threaded holes (not shown) formed in supports 13 to fasten supports 13 to track rail 1.

As shown in FIG. 3, table 15 is arranged between both supports 13, and both ends of table 15 are attached to sliding unit 3. More specifically, table 15 is formed so that its overall shape is that of the letter "U". The suspended portions of both ends of table 15 are fastened to mounting surface 6a (refer to FIGS. 1 and 2) of casing 6 equipped on sliding unit 3 by means of bolts 9.

FIG. 4 shows another example of the case of using the above-mentioned linear motion rolling guide unit in a vertical manner.

As shown in the drawing, L-shaped brackets 17 are fastened to casing 6 of each sliding unit 3 in this example. A flat table 18 is then fastened to both of said brackets 17 by means of bolts 19.

As described above, in the case of using the linear motion guide unit of the prior art in a vertical manner, the table to be attached must be formed into a "U" shape, or the table must be attached by means of L-shaped brackets. Thus, the weight of the moving portion that includes the table and brackets increases. As a results it is difficult to improve response characteristics and so on. Also, since the machining accuracy of the U-shaped table and L-shaped brackets must be high to avoid the effect on mounting error by the-right angles of the bent portions of said U-shaped table and L-shaped brackets, manufacturing costs.

SUMMARY OF THE INVENTION

In consideration of the above-mentioned disadvantages of the prior art, the object of the present invention is to provide a linear motion guide unit that contributes to reduced weight and reduced manufacturing costs of the moving portion, such as the table to be supported and guided.

The present invention provides a linear motion guide unit equipped with a track rail, in which tracks are formed along the lengthwise direction, and a slider able to move relative to the track rail, wherein, a mounting surface is provided on the end of the direction of movement of said slider, and a mounting portion is provided for mounting a fastening member to the mounting surface.

DESCRIPTION OF THE PREFERRED EMBODIMENTS

Figure 1:
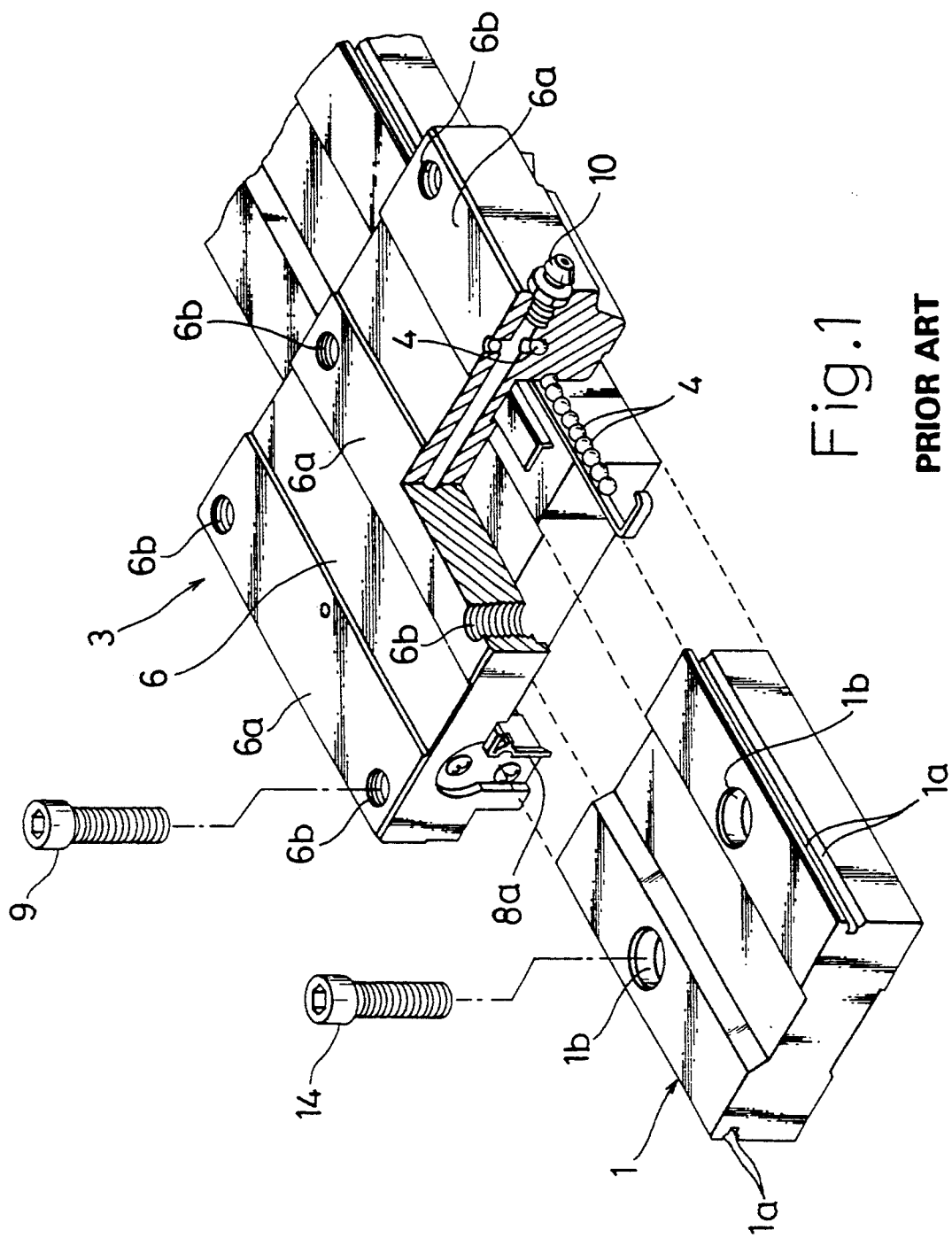
FIG. 1 is a perspective view, including a cross-section, of the essential portion of the linear motion rolling guide unit of the prior art.
Figure 2:
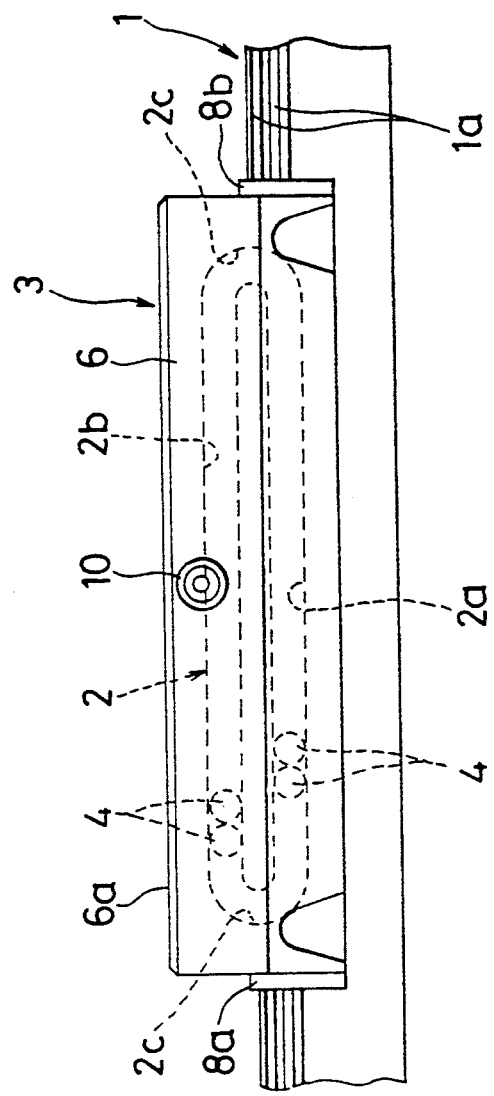
FIG. 2 is a front view of the essential portion of the linear motion rolling guide unit shown in FIG. 1.
Figure 3:
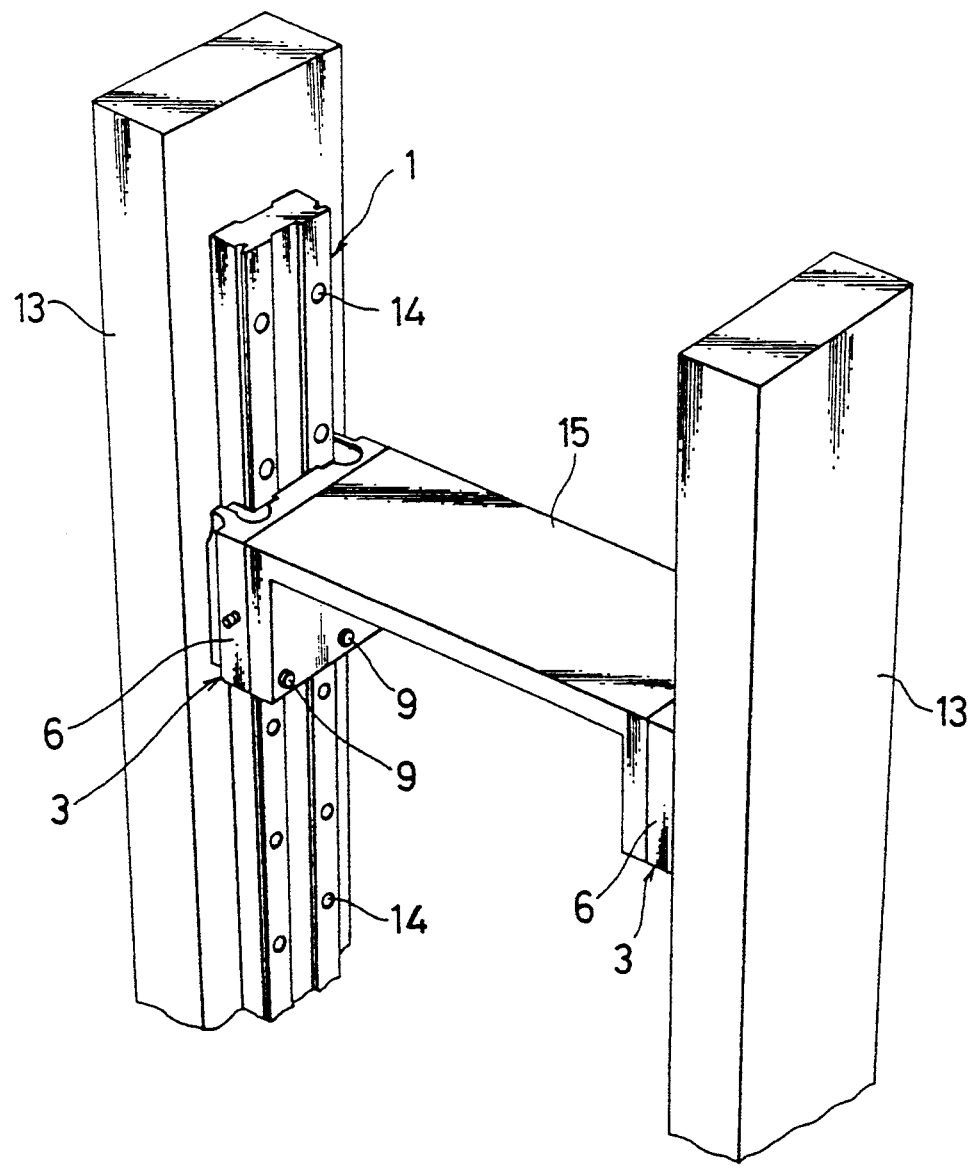
FIG. 3 is a perspective view showing the case of using the linear motion rolling guide unit shown in FIGS. 1 and 2 in a vertical manner.
Figure 4:
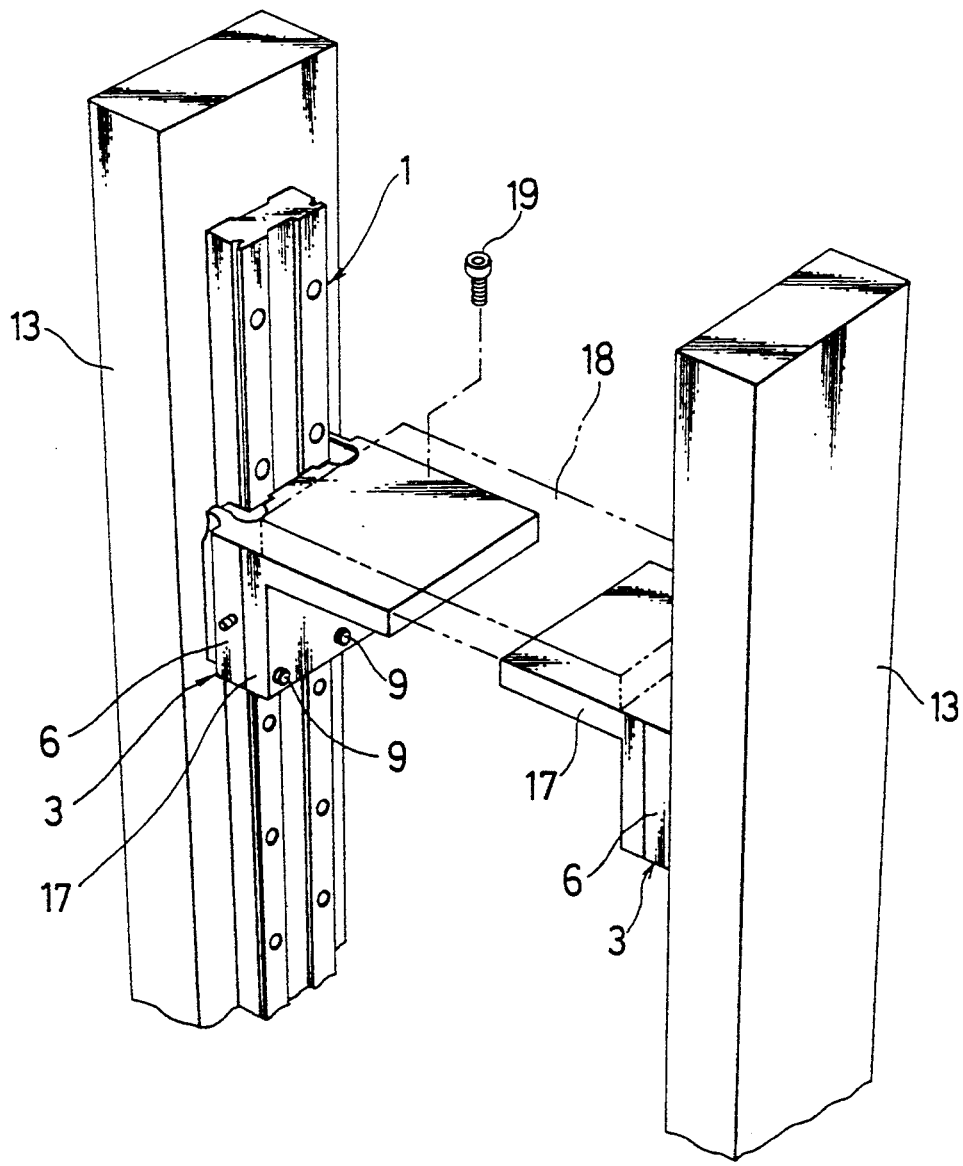
FIG. 4 is a perspective view showing another case of using the linear motion linear rolling guide unit shown in FIGS. 1 and 2 in a vertical manner.

The following provides an explanation of a linear motion rolling guide unit as an embodiment of the present invention with reference to the attached drawings. Furthermore, since the linear motion rolling guide unit is composed similar to the linear motion rolling guide unit of the prior art shown in FIGS. 1 through 4 with the exception of those portions explained below, the explanation will only focus on the essential portion with an overall explanation of the unit omitted. In addition, in the following explanation, the same reference numerals will be used for those constituent members which are identical to the constituent members of said linear motion rolling guide unit of the prior art device.

Figure 5:
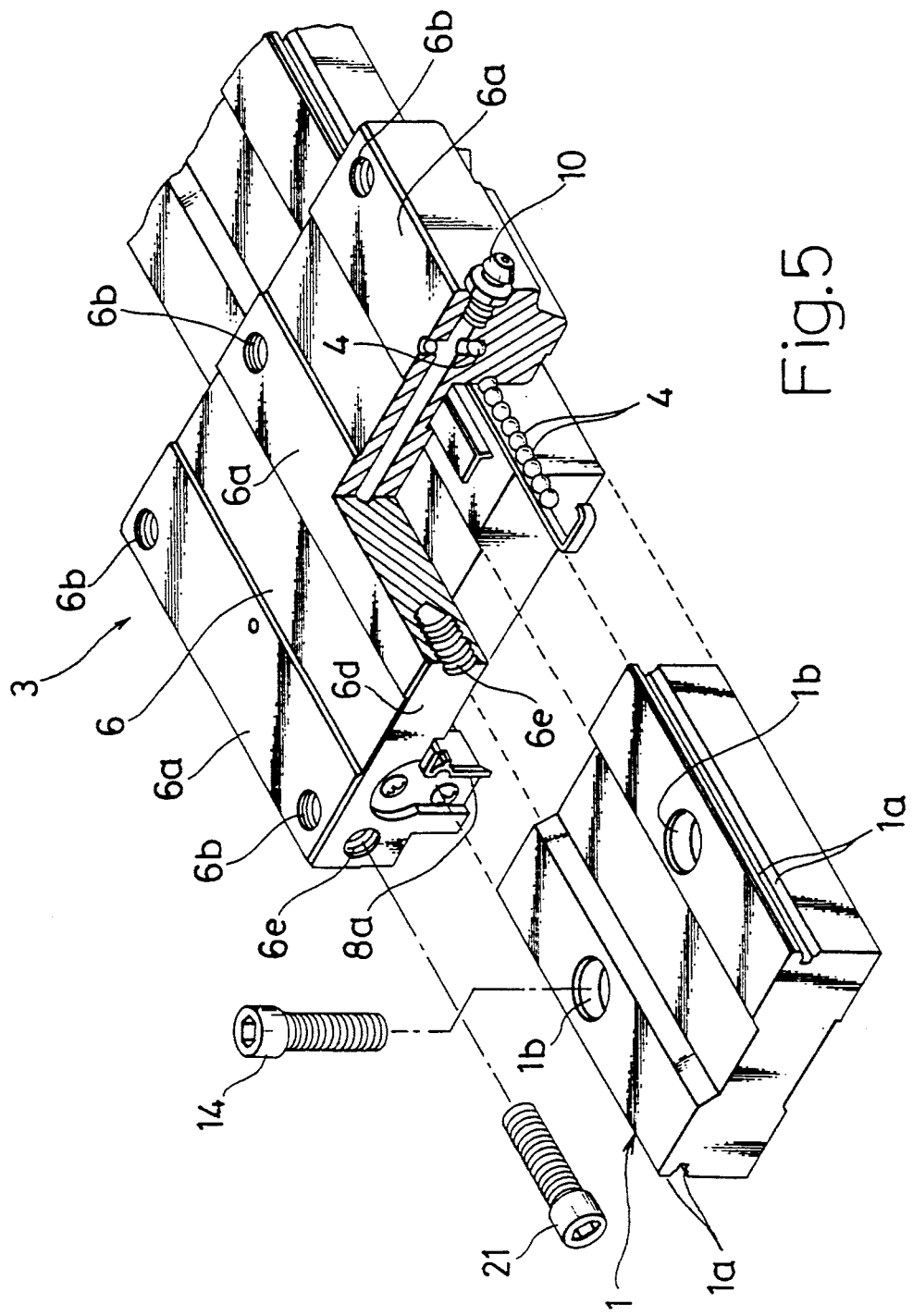
FIG. 5 is a perspective view, including a cross-section, of the essential portion of a linear motion rolling guide unit as an embodiment of the present invention.

As shown in FIG. 5, in the linear motion rolling guide unit as claimed in the present invention, flat mounting surfaces 6d are formed on both ends in the direction of movement of casing 6 equipped on a slider in the form of sliding unit 3. However, only mounting surface 6d on one side is shown in the drawing. Threaded portions, namely mounting portions in the form of threaded holes 6e, into which are screwed fastening members in the form of bolts 21, are formed at, for example, 3 locations at equal pitch in the right and left directions of casing 6. Furthermore, FIG. 5 shows a cross-section in which a portion of casing 6 has been cut away. Since one of these three threaded holes 6e is provided in the portion that has been cut away in this drawing, only two threaded holes 6e are shown in the drawing.

However, the entirety of casing 6 is formed in one solid piece using metal as the material, including the portion in which rolling element circulating path (2, refer to FIG. 2) is formed for circulation of balls 4. Accordingly, even if threaded holes 6e are formed in the ends of casing 6 as described above, and a table to be described later is fastened to said casing 6, there are no problems with respect to mechanical strength.

Figure 6:
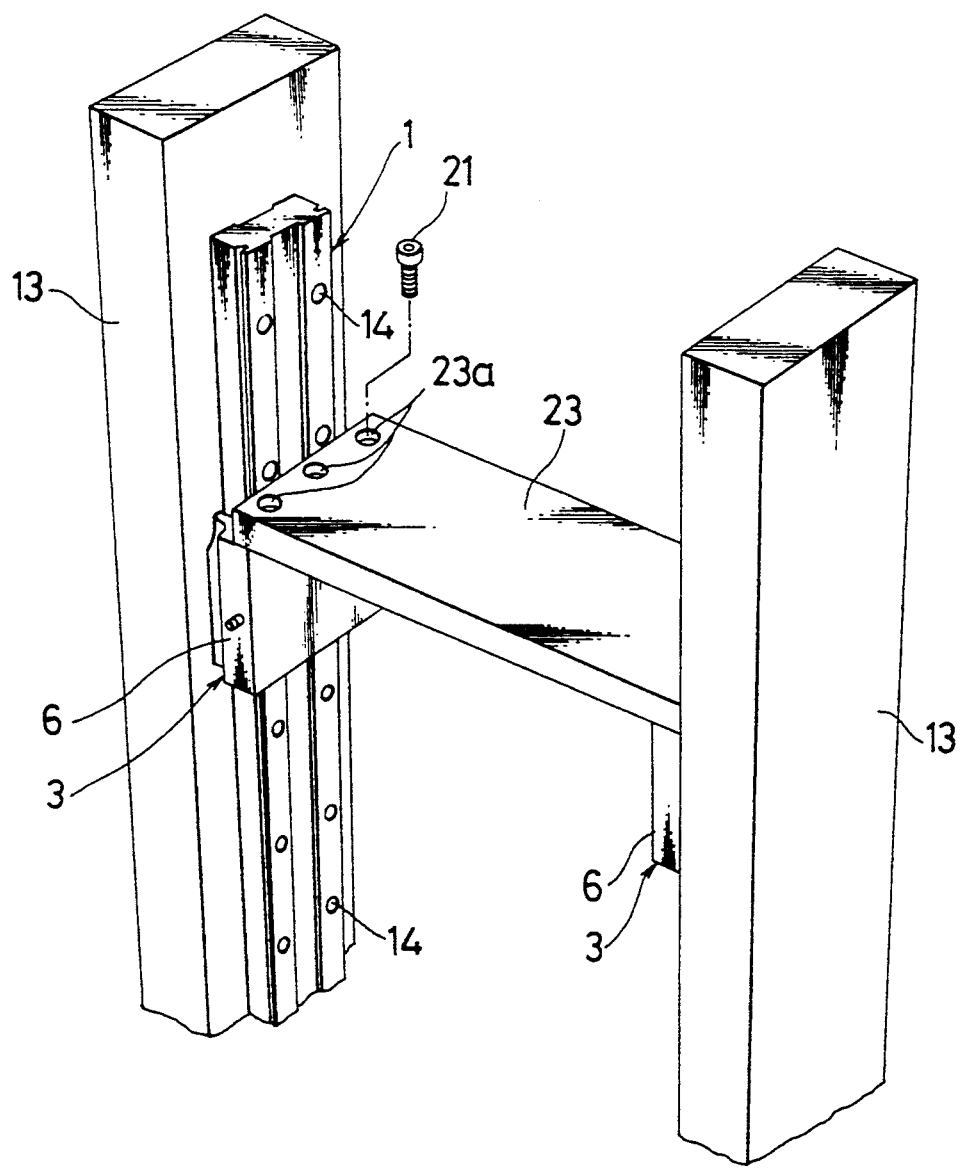
FIG. 6 is a perspective view showing the linear motion rolling guide unit shown in FIG. 5 used in a vertical manner.

FIG. 6 shows the case of using the linear motion rolling guide unit having the above-mentioned constitution with track rail 1 positioned vertically.

As shown in the drawing, table 23 to be supported and guided by linear motion rolling guide unit is simply formed into a rectangular flat plate, and bolt insertion holes 23a are formed in both of its ends. The bottom surfaces of both ends of this table 23 make contact with mounting surfaces 6d of casing 6. Bolts 21 are inserted into these bolt insertion holes 23a and screwed into threaded holes 6e provided in casing 6, thereby fastening table 23 to casing 6.

Since table 23 is simply in the form of a flat plate in this constitution, the moving portion containing table 23 is lightweight resulting in improved response characteristics during operation. In addition, since table 23 does not have any bent portions in the manner of the U-shaped table and L-shaped bracket required in the prior art, there is no need whatsoever to take into consideration the effect on mounting error of the right angles of the bent portions. Thus, there is no need to significantly increase the machining accuracy of table 23 thereby resulting in reduced manufacturing costs.

As for the linear motion rolling guide unit itself, since, with respect to the constitution of the prior art, essentially only threaded holes 6e need be formed in casing 6, the linear motion rolling guide unit of the prior art can still be used thus allowing a reduction in costs.

Furthermore, although the present embodiment indicates a linear motion rolling guide unit of the type in which sliding unit 3 has a rolling element circulating path and balls 4 are used for the rolling elements, the present invention is not limited to such a constitution, but can naturally be applied to other types of linear motion rolling guide units as well.

In addition, although balls 4 are used for the rolling elements in the present embodiment, a constitution be also be employed in which rollers are used instead.

Moreover, although another mounting surface 6a is formed on the top of casing 6 equipped on sliding unit 3 in the present embodiment, this mounting surface 6a need not always be provided.

In addition, although threaded holes 6e are-formed on the ends in the direction of movement of casing 6 and bolts 21 are screwed into threaded holes 6e in the present embodiment, conversely, a constitution may also be employed in which screwing parts, namely mounting parts in the form of male screws, are protruding from both ends in the direction of movement of casing 6, and fastening members in the form of nuts are screwed onto said male screws. In addition, fastening members other than bolts and nuts may be suitably selected and used for said fastening members.

As explained above, the present invention offers the advantage of contributing to reduced weight and reduced manufacturing costs with respect to the moving part such as a table to be guided and supported.

What is claimed is:

1. A linear motion rolling guide unit equipped with a track rail, comprising: track grooves formed in a lengthwise direction along both sides of said track rail, a slider movable relative to said track rail, said slider having a casing in which grooves are formed, said grooves being in opposition to respective ones of said track grooves, said casing having endcaps at ends thereof and seal members arranged on said endcaps and said slider having a mounting surface provided on at least one end thereof disposed in the direction of slider movement, a mounting portion provided on said mounting surface, and a table, which extends transversely with respect to the direction of slider movement attached to said mounting surface, rolling elements being disposed in said track grooves, said rolling elements circulating through said grooves as said slider moves along said track rail, a flat upper surface of said slider being perpendicular to said mounting surface and parallel to a lower surface of said track rail.

* * * * *